United States Patent
Khandekar et al.

(10) Patent No.: US 11,330,027 B1
(45) Date of Patent: May 10, 2022

(54) METHODS, SYSTEMS, AND COMPUTER READABLE MEDIA FOR HYPERTEXT TRANSFER PROTOCOL (HTTP) STREAM TUNING FOR LOAD AND OVERLOAD

(71) Applicant: Oracle International Corporation, Redwood Shores, CA (US)

(72) Inventors: Tukaram Maruti Khandekar, North Chelmsford, MA (US); Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/203,693

(22) Filed: Mar. 16, 2021

(51) Int. Cl.
   *H04L 29/06* (2006.01)
   *H04L 65/61* (2022.01)
   *H04L 65/10* (2022.01)
   *H04L 67/02* (2022.01)
   (Continued)

(52) U.S. Cl.
   CPC ...... *H04L 65/4069* (2013.01); *H04L 43/0894* (2013.01); *H04L 43/16* (2013.01); *H04L 65/1013* (2013.01); *H04L 67/02* (2013.01)

(58) Field of Classification Search
   CPC ............. H04L 41/5067; H04L 43/0894; H04L 43/0829; H04L 43/16
   See application file for complete search history.

(56) References Cited

U.S. PATENT DOCUMENTS 10,637,753 B1  4/2020  Taft et al.
2015/0358385 A1* 12/2015  Ruellan ................... G06F 9/547
                                                                709/203
(Continued)

FOREIGN PATENT DOCUMENTS

WO    WO 2022/050987 A1    3/2022

OTHER PUBLICATIONS

Notification of Transmittal of the International Search Report and the Written Opinion of the International Searching Authority, or the Declaration for International Application No. PCT/US2021/024000 (dated Jun. 24, 2021).

(Continued)

*Primary Examiner* — Chirag R Patel
(74) *Attorney, Agent, or Firm* — Jenkins, Wilson, Taylor & Hunt, P.A.

(57) ABSTRACT

A method for HTTP stream tuning during load and overload control includes, at a first NF, determining a load/overload level of the first. The method further includes determining an initial value for an HTTP SETTINGS_MAX_CONCURRENT_STREAMS parameter. The method further includes publishing the initial value of the HTTP SETTINGS_MAX_CONCURRENT_STREAMS parameter to a second NF that sends traffic to the first NF. The method further includes determining that the load/overload level of the first NF has changed. The method further includes, in response to determining that the load/overload level has changed, adjusting the value of the HTTP SETTINGS_MAX_CONCURRENT_STREAMS parameter based on the load/overload level and a direction of change in the load/overload level. The method further includes publishing the adjusted value of the HTTP SETTINGS_MAX_CONCURRENT_STREAMS parameter to the second NF.

20 Claims, 7 Drawing Sheets

(51) Int. Cl.
*H04L 43/16* (2022.01)
*H04L 43/0894* (2022.01)

(56) References Cited

U.S. PATENT DOCUMENTS

| | | | |
|---|---|---|---|
| 2019/0116217 A1* | 4/2019 | Dhanabalan | H04L 47/2475 |
| 2019/0245767 A1* | 8/2019 | Di Girolamo | H04L 43/0811 |
| 2020/0153886 A1* | 5/2020 | Dhanabalan | H04L 69/14 |
| 2022/0070648 A1 | 3/2022 | Krishan | |

OTHER PUBLICATIONS

Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

"TCP congestion control," Wikipedia, pp. 1-15 (Mar. 4, 2021).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Belshe et al., "Hypertext Transfer Protocol Version 2 (HTTP/2)," Internet Engineering Task Force (IETF), RFC 7540, pp. 1-96 (May 2015).

\* cited by examiner

METHODS, SYSTEMS, AND COMPUTER READABLE MEDIA FOR HYPERTEXT TRANSFER PROTOCOL (HTTP) STREAM TUNING FOR LOAD AND OVERLOAD

TECHNICAL FIELD

The subject matter described herein relates to load and overload control in communications networks. More particularly, the subject matter described herein relates to methods, systems, and computer readable media for HTTP stream tuning for load and overload control.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is ineffective mechanisms for preventing a consumer NF from overwhelming the resources of a producer NF. For example, existing 3GPP-defined procedures allow NF service producers to signal service consumers of load information of the service producers. However, the load information is optional and may be ignored by service consumers. In addition, the load information may be sent in low priority messages that may not reach the service consumer at all or in time to prevent the producer NF from becoming overloaded. 3GPP also mentions TCP and HTTP procedures that can be used by a producer NF for overload control. However, the TCP procedures are connection specific, and while HTTP procedures are mentioned, a method for dynamically adjusting load and overload control thresholds that addresses the changing needs of a network is not described. As a result, the resources of the NF service producer can be overwhelmed, resulting in retries on the part of the consumer NF with an alternate NF service producer, and such retries waste network resources and resources of the NF service consumer.

Accordingly, in light of these and other difficulties, there exists a need for improved methods, systems, and computer readable media for throttling traffic from an NF service consumer.

SUMMARY

A method for hypertext transfer protocol (HTTP) stream tuning during load and overload control includes, at a first network function (NF) including at least one processor and a memory, determining a load/overload level of the first NF. The method further includes determining an initial value for an HTTP SETTINGS_MAX_CONCURRENT_STREAMS parameter. The method further includes publishing the initial value of the HTTP SETTINGS_MAX_CONCURRENT_STREAMS parameter to a second NF that sends traffic to the first NF. The method further includes determining that the load/overload level of the first has changed. The method further includes, in response to determining that the load/overload level has changed, adjusting the value of the HTTP SETTINGS_MAX_CONCURRENT_STREAMS parameter based on the load/overload level and a direction of change in the load/overload level. The method further includes publishing the adjusted value of the HTTP SETTINGS_MAX_CONCURRENT_STREAMS parameter to the second NF.

According to another aspect of the subject matter described herein, the first NF comprises a producer NF and the second NF comprises a consumer NF that sends traffic to the producer NF According to another aspect of the subject matter described herein, the first NF comprises a producer NF and the second NF comprises a service communications proxy (SCP) or security edge protection proxy (SEPP) that sends traffic to the producer NF.

According to another aspect of the subject matter described herein, the first NF comprises a service communications proxy (SCP) or a security edge protection proxy (SEPP) and the second NF comprises a consumer that sends traffic to the SCP or SEPP.

According to another aspect of the subject matter described herein, determining the initial value of the HTTP SETTINGS_MAX_CONCURRENT_STREAMS parameter includes calculating the initial value based on a desired transaction rate per second for the second NF and a roundtrip time for messaging between the first and second NFs.

According to another aspect of the subject matter described herein, determining the initial value based on the desired transaction rate and the roundtrip time includes determining the initial value using the following equation:

$$MaxConStrms = RTT(\text{ms})\left(\frac{RequestRate(\text{Requests/s})}{1000 \text{ (ms/s)}}\right),$$

where MaxConStrms is the HTTP SETTINGS_MAX_CONCURRENT_STREAMS parameter, RTT is the roundtrip time between the first and second NFs, and RequestRate is a desired request rate from the second NF.

According to another aspect of the subject matter described herein, determining that the load/overload level has changed includes determining that the load/overload level has increased.

According to another aspect of the subject matter described herein, adjusting the value of the HTTP SETTINGS_MAX_CONCURRENT_STREAMS parameter includes reducing the value of the HTTP SETTINGS_MAX_CONCURRENT_STREAMS parameter by a fixed amount upon expiration of a timer and repeating the reducing until a minimum stream count for a current load/overload level is reached.

According to another aspect of the subject matter described herein, determining that the load/overload level has changed includes determining that the load/overload level has decreased.

According to another aspect of the subject matter described herein, adjusting the value of the HTTP SETTINGS_MAX_CONCURRENT_STREAMS parameter includes increasing the value of the HTTP SETTINGS_MAX_CONCURRENT_STREAMS parameter by a fixed amount upon expiration of a timer and repeating the increasing until a maximum stream count for a current load/overload level is reached.

According to another aspect of the subject matter described herein, A system for hypertext transfer protocol (HTTP) stream tuning during load and overload control is provided. The system includes a first network function (NF) including at least one processor and a memory. The system further includes a load/overload controller implemented by the at least one processor for determining a load/overload level of the first NF, determining an initial value for an HTTP SETTINGS_MAX_CONCURRENT_STREAMS parameter, publishing the initial value of the HTTP SETTINGS_MAX_CONCURRENT_STREAMS parameter to the second NF, determining that the load/overload level of the first NF or the second NF has changed, in response to determining that the load/overload level has changed, adjusting the value of the HTTP SETTINGS_MAX_CONCURRENT_STREAMS parameter based on the load/overload level and a direction of change in the load/overload level, and publishing the adjusted value of the HTTP SETTINGS_MAX_CONCURRENT_STREAMS parameter to the second NF.

According to another aspect of the subject matter described herein, the load/overload controller is configured to determine the initial value of the SETTINGS_MAX_CONCURRENT_STREAMS parameter based on a desired transaction rate per second for the second NF and a roundtrip time for messaging between the first and second NFs.

According to another aspect of the subject matter described herein, the load/overload controller is configured to determine the initial value of the SETTINGS_MAX_CONCURRENT_STREAMS parameter using the following equation:

$$MaxConStrms = RTT(\text{ms})\left(\frac{RequestRate(\text{Requests/s})}{1000 \text{ (ms/s)}}\right),$$

where MaxConStrms is the HTTP SETTINGS_MAX_CONCURRENT_STREAMS parameter, RTT is the roundtrip time between the first and second NFs, and RequestRate is a desired request rate from the second NF.

According to another aspect of the subject matter described herein, the load/overload controller is configured to determine that the load/overload level has increased.

According to another aspect of the subject matter described herein, the load/overload controller is configured to adjust the value of the HTTP SETTINGS_MAX_CONCURRENT_STREAMS parameter by reducing the value of the HTTP SETTINGS_MAX_CONCURRENT_STREAMS parameter by a fixed amount upon expiration of a timer and repeat the reducing until a minimum stream count for a current load/overload level is reached.

According to another aspect of the subject matter described herein, the load/overload controller is configured to determine that the load/overload level has decreased.

According to another aspect of the subject matter described herein, the load/overload controller is configured to adjust the value of the HTTP SETTINGS_MAX_CONCURRENT_STREAMS parameter by increasing the value of the HTTP SETTINGS_MAX_CONCURRENT_STREAMS parameter by a fixed amount upon expiration of a timer and repeat the increasing until a maximum stream count for a current load/overload level is reached.

According to another aspect of the subject matter described herein, a non-transitory computer readable medium having stored thereon executable instructions that when executed by a processor of a computer controls the computer to perform steps. The steps include, at a first network function (NF) including at least one processor, determining a load/overload level of the first NF. The steps further include determining an initial value for a hypertext transfer protocol (HTTP) SETTINGS_MAX_CONCURRENT_STREAMS parameter. The steps further include publishing the initial value of the HTTP SETTINGS_MAX_CONCURRENT_STREAMS parameter to a second NF that sends traffic to the first NF. The steps further include determining that the load/overload level of the first NF has changed. The steps further include, in response to determining that the load/overload level has changed, adjusting the value of the HTTP SETTINGS_MAX_CONCURRENT_STREAMS parameter based on the load/overload level and a direction of change in the load/overload level. The steps further include publishing the adjusted value of the HTTP SETTINGS_MAX_CONCURRENT_ STREAMS parameter to the second NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and applica-

DETAILED DESCRIPTION

Figure 1:
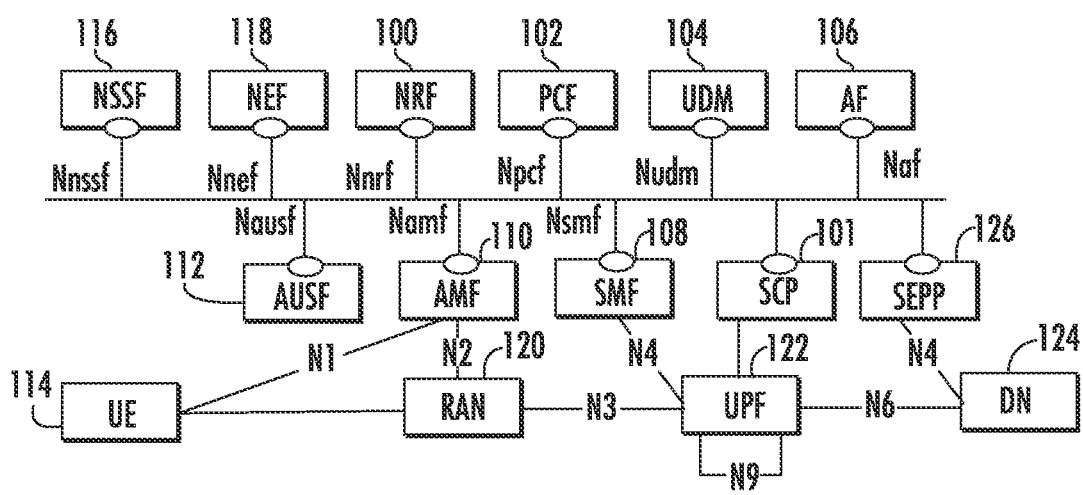
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As described above, one problem that can occur in 5G networks is the lack of an effective mechanism for load and overload control. 3GPP TS 29.500 defines load and overload control procedures to be used by an NF service producer. For example, Section 6.3.1 of 3GPP TS 29.500 states:

Load control enables an NF Service Producer to signal its load information to NF Service Consumers, either via the NRF (as defined in clause 6.3.2) or directly to the NF Service Consumer (as defined in clause 6.3.3). The load information reflects the operating status of the resources of the NF Service Producer.

Load control allows for better balancing of the load across NF Service Producers, so as to attempt to prevent their overload in first place (preventive action). Load control does not trigger overload mitigation actions, even if the NF Service Producer reports a high load.

Figure 2:
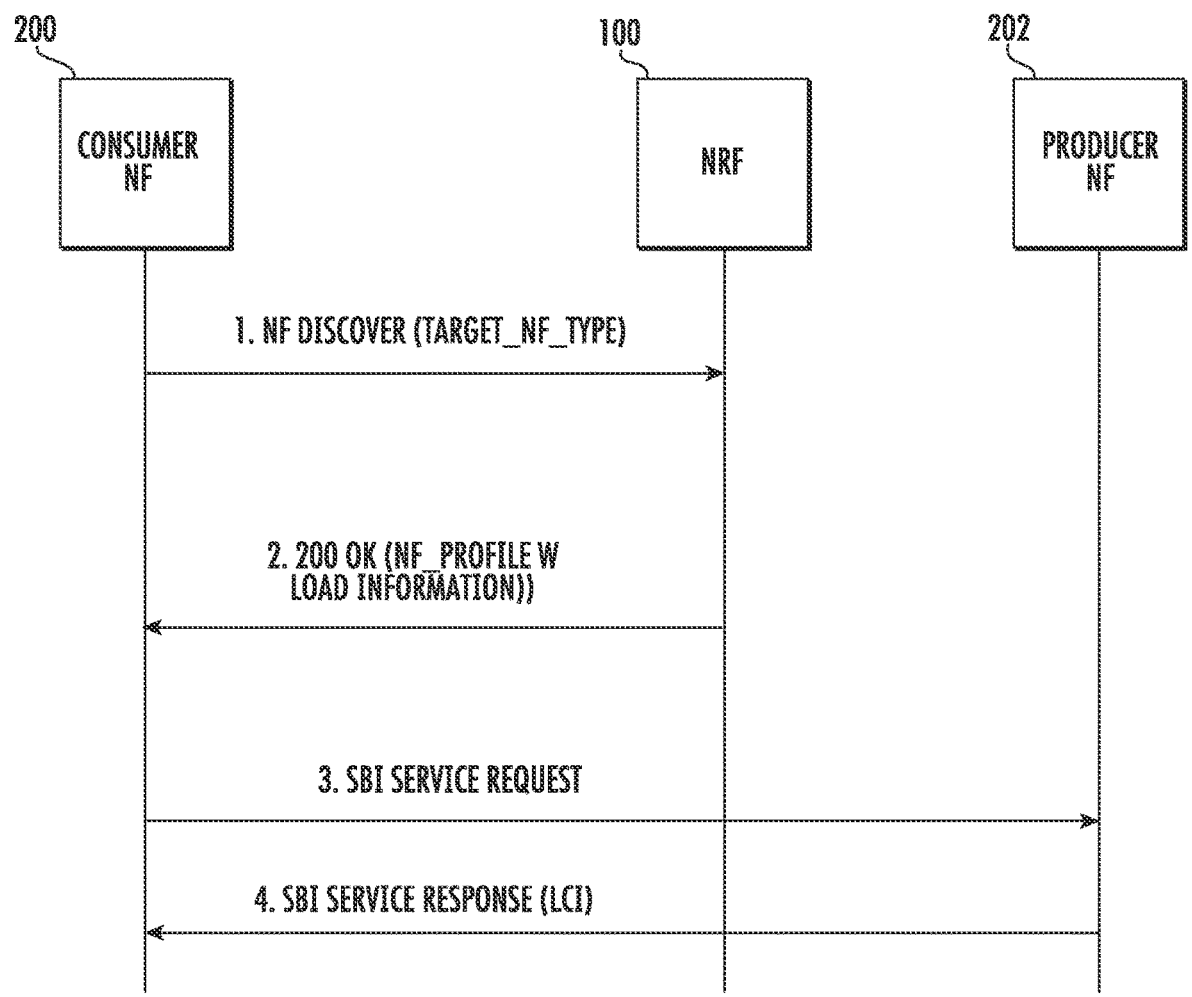
FIG. 2 is a message flow diagram illustrating exemplary messages exchanged for 3GPP-defined load/overload control procedures.

In the above-quoted passage, 3GPP TS 29.500 defines procedures for NF service producers to inform NF service consumers of load conditions. FIG. 2 illustrates both of these load control mechanisms. In FIG. 2, in line 1 of the message flow diagram, a consumer NF 200 sends a discovery request to NRF 100. It is assumed that producer NF 202 has previously registered with NRF 100. In line 2 of the message flow diagram, NRF 100 responds to the discovery request with the NF profile of producer NF 202. The NF profile includes load information of producer NF 202. This corresponds to the first mechanism described above with regard to 3GPP TS 29.500 for conveying load information to a consumer NF during service discovery. In line 3 of the message flow diagram, consumer NF 200 sends a service based interface (SBI) service request to producer NF 202. In line 4 of the message flow diagram, producer NF 202 sends an SBI service response to consumer NF 200. The SBI service response may include load control information specified or carried in a header of the SBI service response. One problem with both of these mechanisms, as will be described in more detail below, is that consumer NF 200 may ignore the load information or load control information and may still overwhelm the resources of producer NF 202.

Overload control for 5G networks is defined in section 6.4 of 3GPP TS 29.500. In Section 6.4.1, 3GPP TS 29.500 states as follows:

> Service Based Interfaces use HTTP/2 over TCP for communication between the NF Services. TCP provides transport level congestion control mechanisms as specified in IETF RFC 5681 [16], which may be used for congestion control between two TCP endpoints (i.e., hop by hop). HTTP/2 also provides flow control mechanisms and limitation of stream concurrency that may be configured for connection level congestion control, as specified in IETF RFC 7540 [7].

In the above-quoted passage, 3GPP TS 29.500 mentions that TCP and HTTP/2 provide flow control mechanisms, but does not define procedures for incorporating these mechanisms to dynamically control the message rate of a consumer NF.

One issue with using existing 3GPP-defined load control mechanisms in 5G networks is that the above-described NRF-based model of publishing load information is slow, as it requires 3 nodes (the producer NF, NRF, and consumer NF) to react to the producer NF's load level. To address this issue, 3GPP TS 29.500 recommends optional load control information (LCI) and overload control information (OCI) headers that can be published directly from producer NFs or consumer NFs (and also for notification paths). 3GPP TS 29.500 recommends that load and overload indications piggy back on responses to service requests or notifications for an endpoint. This means that processing of load and overload information in response messages is governed by the values of 3gpp-Sbi-Message-Priority and stream priority attributes. One issue with piggybacking LCI and OCI information on existing response messages with message or stream-based priority is the that the message or stream-based priority may be low, and a low priority means the message is likely to be rejected at intermediate nodes if the intermediate nodes become congested. In addition, processing of low priority messages may be delayed at the consumer NF due to other high priority responses being processed first. Further, because load and overload indications are optional data, consumer NFs can ignore the load and overload control indications. Because consumer NFs can ignore load and overload control indications, a producer NF cannot expect a consumer NF to throttle the load on the producer NF. When a consumer NF keeps loading a producer NF and leads into an overload condition at the producer NF, then the producer NF has no choice but to throttle the traffic. This process leads to wasting of resources and can also lead to delayed processing of traffic.

One example of resources that are wasted by overloading a producer NF are the processing resources at the consumer NF. Another example of resources that are wasted by overloading a producer NF are the network resources between the consumer and producer NF. Producer NF processing resources may also be wasted in deciding to reject a message from a consumer NF. Consumer NF and network resources are further wasted by the consumer NF needing to retry a service request through an alternate producer NF.

Having an overload avoidance and control strategy that reduces the number of rejections, will lead to the following benefits:

Better utilization of network and compute resources; and
Consumer NFs can achieve higher throughput with better latency for SBI interfaces in the 5G network.

The proposed solution described herein allows a producer NF to specify a maximum number of concurrent HTTP/2 streams that the producer NF will allow, forcing the consumer NF to throttle traffic. The producer NF dynamically adjusts the maximum number of concurrent HTTP/2 streams to maintain a desired load level at the producer NF. This mechanism works seamlessly with the above-described 3GPP-defined load and overload procedures. Using HTTP/2 concurrent streams to control loading of a producer NF complements the 3GPP-defined solutions and forces consumer NFs to reduce traffic as per the load/overload level of the producer NF.

The subject matter described herein utilizes the HTTP concurrent streams parameter to control the message rate of a consumer NF. The HTTP/2 specification (IETF RFC 7540) allows an endpoint to control "concurrent streams" at runtime. This means that an HTTP/2 server (i.e., the producer NF) can control the number of active/open streams that an HTTP/2 client (i.e., the consumer NF) can have for a given connection. The subject matter described herein provides a mechanism for the HTTP/2 server to manipulate the maximum number of allowed concurrent streams during load and overload conditions.

Section 5.1.2 of IETF RFC 7540 states as follows:

> A peer can limit the number of concurrently active streams using the SETTINGS_MAX_CONCURRENT_STREAMS parameter (see Section 6.5.2) within a SETTINGS frame. The maximum concurrent streams setting is specific to each endpoint and applies only to the peer that receives the setting.
>
> . . .
>
> Endpoints MUST NOT exceed the limit set by their peer.
>
> . . .
>
> An endpoint that wishes to reduce the value of SETTINGS_MAX_CONCURRENT_STREAMS to a value that is below the current number of open streams can either close streams that exceed the new value or allow streams to complete.

In the above-quoted passage, IETF RFC 7540 indicates that the SETTINGS_MAX_CONCURRENT_STREAMS parameter may be set and used by an endpoint to control the maximum number of open streams allowed from a peer endpoint. Section 6.5 of IETF RFC 7540 states as follows:

> A SETTINGS frame MUST be sent by both endpoints at the start of a connection and MAY be sent at any other time by either endpoint over the lifetime of the connection. (Emphasis added.)

In Section 6.5, IETF RFC 7540 indicates that the SETTINGS frame, which carries the SETTINGS_MAX_CONCURRENT_STREAMS parameter, must be sent at the beginning of a connection and may be sent by endpoints at other times during the lifetime of a connection. The subject matter described herein provides for a producer NF to set the SETTINGS_MAX_CONCURRENT_STREAMS parameter to an initial value based on a desired processing latency at the producer NF and then to adjust the SETTINGS_MAX_CONCURRENT_STREAMS parameter to control loading of the producer NF by a consumer NF.

Figure 3:
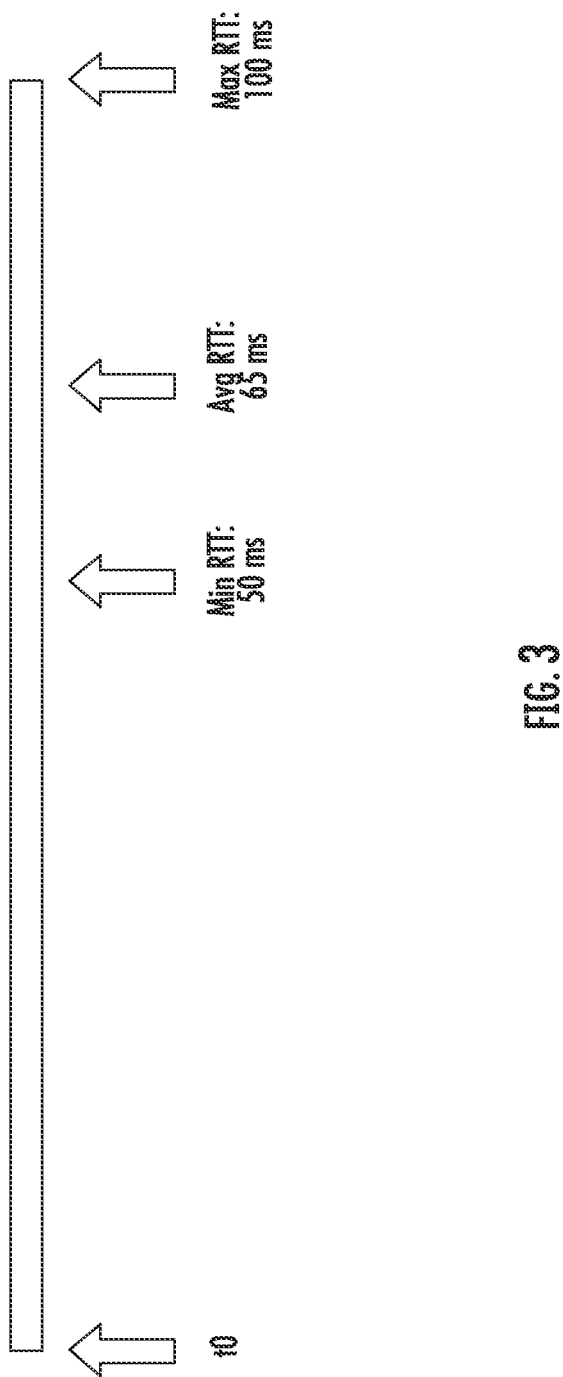
FIG. 3 is a timing diagram illustrating roundtrip times (RTTs) that can be used to determine a value for the SETTINGS_MAX_CONCURRENT_STREAMS to achieve a desired request rate from a consumer NF.

The HTTP/2 SETTINGS_MAX_CONCURRENT_STREAMS parameter can be used to control the message rate of a consumer NF. FIG. 3 is a timing diagram illustrating minimum, average, and maximum message roundtrip time (RTT) between a client and a server application. In FIG. 3, the minimum RTT is 50 ms, the average RTT is 65 ms, and the maximum RTT is 100 ms. For the minimum RTT of 50 ms, a stream created at t0 will be responded at processed at t50. Thus, if the number of concurrent streams from the consumer NF reaches a number equal to the SETTINGS_MAX_CONCURRENT_STREAMS parameter during 50 ms window, then the consumer NF cannot send further requests until producer NF responds at t50. Thus, by controlling maximum number of concurrent streams, the producer NF can control traffic rate from the consumer NF on a given connection. For example, if the SETTINGS_MAX_CONCURRENT_STREAMS parameter is set to 32, then the maximum request rate can be calculated as follows:

$$\left(\frac{32 \text{ requests}}{50 \text{ ms}}\right) * \left(\frac{1000 \text{ ms}}{1 \text{ s}}\right) = 640 \text{ requests/s} \quad (1)$$

Writing Equation 1 in general form and solving for SETTINGS_MAX_CONCURRENT_STREAMS yields:

$$\left(\frac{MaxConStrms}{RTT(\text{ms})}\right) * \left(\frac{1000 \text{ ms}}{1 \text{ s}}\right) = RequestRate(\text{Requests/s}) \quad (2)$$

$$MaxConStrms = RTT(\text{ms}) \left(\frac{RequestRate(\text{Requests/s})}{1000 \text{ ms/s}}\right)$$

From Equation 2, if the RTT and the desired request rate are known, the value of MaxConStrms, which is the value of the SETTINGS_MAX_CONCURRENT_STREAMS can be calculated.

Table 1 shown below illustrates how the SETTINGS_MAX_CONCURRENT_STREAMS parameter from server/producer NF can be used to define the maximum request rate from a client (consumer NF) on a single HTTP/2 connection:

The maximum message rates in Table 1 are computed using the same calculation as Equation 1 above for each RTT and SETTINGS_MAX_CONCURRENT_STREAMS parameter value. Accordingly, based on the SBI service request processing latency at the producer NF, if the producer NF adjusts the SETTINGS_MAX_CONCURRENT_STREAMS parameter value, the producer NF can control the amount of traffic flow from the consumer NF.

The subject matter described herein includes a recommended strategy that a producer NF can follow to adjust the HTTP/2 SETTINGS_MAX_CONCURRENT_STREAMS value with consumer NFs. The solutions described herein are applicable to intermediate nodes, such as the SCP or SEPP, as well, to control traffic rates from consumer NFs. If implemented at an SCP or SEPP, the SETTINGS_MAX_CONCURRENT_STREAMS parameter of the consumer NF may be adjusted based on the load or overload levels of SCP or SEPP.

As indicated above with respect to FIG. 3 and Table 1, HTTP/2 concurrent stream manipulation can help a producer NF control the traffic flow. However, there can be "N" different consumer NFs connected to a producer NF and each consumer NF may have "M" HTTP/2 connections set up with the producer NF. Thus, a fixed value of SETTINGS_MAX_CONCURRENT_STREAMS parameter to avoid congestion during connection setup is not a viable option for a producer NF.

Regardless of the number of connections, the following rules will still hold true:

More traffic means more message processing and thus higher resource utilization.

Increased traffic processing leads to an increase in average processing time of messages (due to waiting on compute and other resources). Hence, with an increase in traffic (beyond the break-even point), average processing time of requests and responses will increase. Therefore, average processing time and/or load/overload level (based on CPU utilization and/or other parameters) may be used by a producer NF to

TABLE 1

Maximum Possible Request Rates Given Maximum Concurrent Streams Settings and RTT Values

| SETTINGS_MAX_CONCURRENT_STREAMS | RTT | Calculation | Possible Request Rate |
|---|---|---|---|
| 32 | Min RTT 50 ms | 32 * (1000/50) | 640 |
|  | Avg RTT 65 ms | 32 * (1000/65) | ~490 |
|  | Max RTT 100 ms | 32 * (1000/100) | 320 |
| 100 | Min RTT 50 ms | 100 (1000/50) | 2000 |
|  | Avg RTT 65 ms | 100 (1000/65) | ~1540 |
|  | Max RTT 1000 ms | 100 * (1000/100) | 1000 |
| 1000 | Min RTT 50 ms | 1000 * (1000/50) | 20000 |
|  | Avg RTT 65 ms | 1000 * (1000/65) | ~15000 |
|  | Max RTT 100 ms | 1000 * (1000/100) | 10,000 | decide when and by how much to adjust the value of the SETTINGS_MAX_CONCURRENT_STREAMS parameter.

The value of the SETTINGS_MAX_CONCURRENT_STREAMS parameter cannot be static. The subject matter described herein allows the producer NF to adjust (increase or decrease) the value of the SETTINGS_MAX_CONCURRENT_STREAMS parameter dynamically, so that consumer NFs can adjust their traffic rates accordingly.

Inspiration for the subject matter described herein can be obtained from TCP's slow start behavior during congestion. However, the subject matter described herein is not a direct application of TCP congestion control behavior, i.e., the producer NF will adjust (increase or decrease) the value of the SETTINGS_MAX_CONCURRENT_STREAMS parameter dynamically with change in load level and/or RTT at the producer NF.

Figure 4:
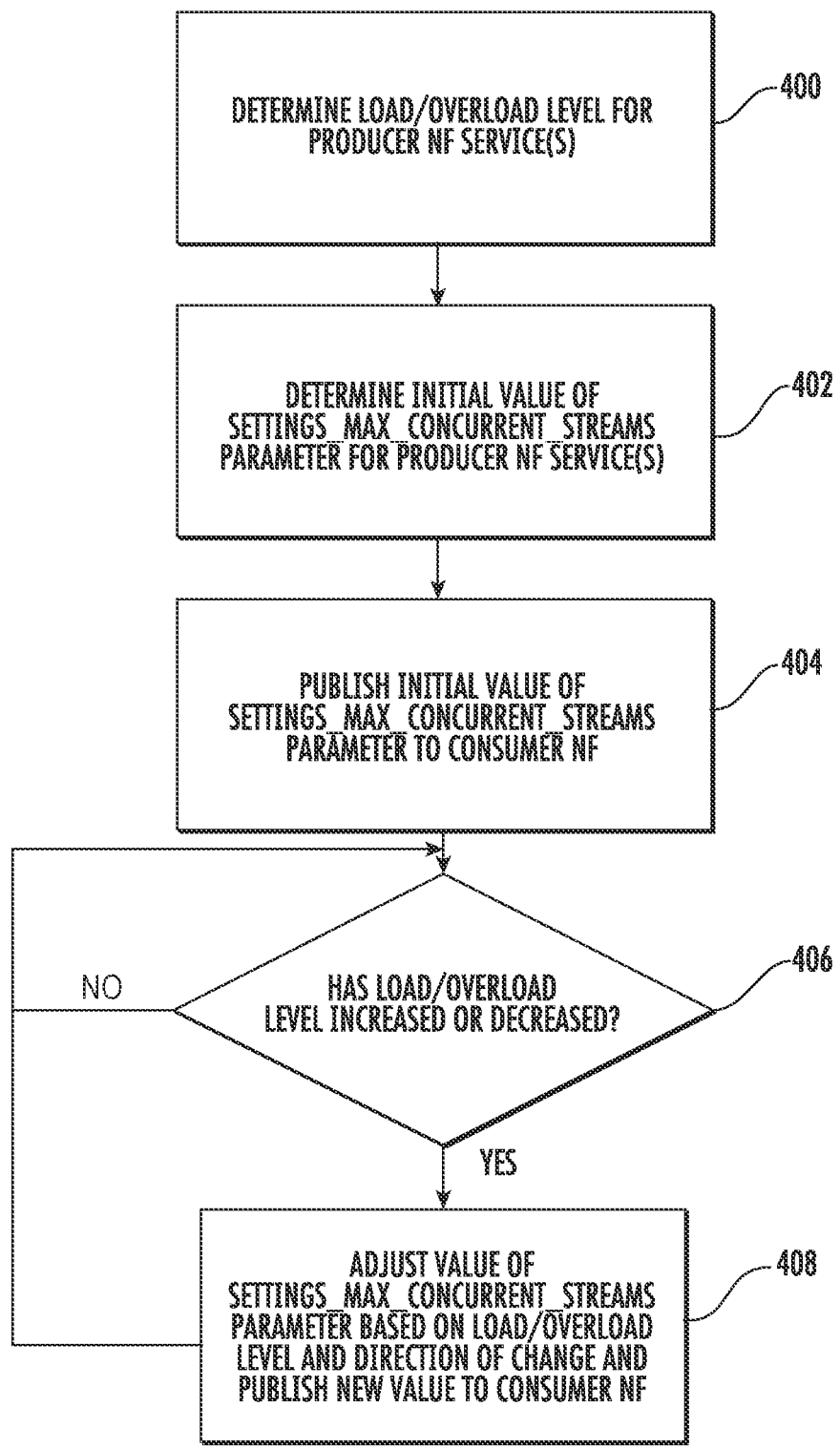
FIG. 4 is a flow chart illustrating an exemplary process for setting the HTTP SETTINGS_MAX_CONCURRENT_STREAMS parameter during load and overload control.

The following steps may be performed by a producer NF or an intermediate node to utilize the SETTINGS_MAX_CONCURRENT_STREAMS parameter to control load/overload at the producer NF or at the intermediate node. The steps are illustrated by the flow chart in FIG. 4.

1. Determine load/overload level for individual producer NF service(s) (step 400 in FIG. 4).
   Load/Overload level for a producer NF service instance can be an aggregation of load/overload levels of CPU, average processing time of requests/responses and other parameters, such as queue depth. The subject matter described herein is not limited to any particular method for defining load/overload levels of a producer NF. If the load/overload control is being implemented at an intermediate node (SCP or SEPP), the load/overload level used to trigger the load/overload control processes described herein may be the load/overload level of the CPU, average processing time of requests/responses, queue depth, etc., of the intermediate node.
2. Determine the initial value of SETTINGS_MAX_CONCURRENT_STREAMS parameter of a connection for a given NF service instance/source IP address (step 402 in FIG. 4).
   With the expected processing time (i.e. RTT) and maximum supported message rate, calculate the initial value of SETTINGS_MAX_CONCURRENT_STREAMS as described above with regard to FIG. 3 and Table 1.
3. Publish the initial value of the SETTINGS_MAX_CONCURRENT_STREAMS parameter to the consumer NF when the consumer NF connects to the producer NF to access a service (step 404 in FIG. 4).
   If the consumer NF is allowed to consume multiple services of a producer NF on a single connection, then the max supported message rate is the sum of rates for the services that the consumer NF is allowed to consume.
   If the node being throttled is an SCP or SEPP, step 404 will be implemented by publishing the initial value of the SETTINGS_MAX_CONCURRENT_STREAMS parameter to the SCP or SEPP. If the node being throttled is an SCP or SEPP, step 404 will be implemented by publishing the initial value of the SETTINGS_MAX_CONCURRENT_STREAMS parameter to the SCP or SEPP.
4. Determine if the load or overload state of the producer NF (or intermediate node) has increased or decreased to a new level (step 406 in FIG. 4) and if so, adjust the SETTINGS_MAX_CONCURRENT_STREAMS parameter based on the load/overload level and the direction of the change in the load/overload level, i.e., whether the level has increased or decreased (step 408 in FIG. 4).

When a service provided by a producer NF (or intermediate node) goes into a higher load/overload level, do the following:
   When a regular interval/timer (referred to as "CT" in Table 2) expires, decrease the value of the SETTINGS_MAX_CONCURRENT_STREAMS parameter by a fixed percentage (referred as "D" in Table 2 below) until a floor (referred to as "M" in Table 2) is reached or the system comes out of the present load/overload level.
   For example, when the initial value of the SETTINGS_MAX_CONCURRENT_STREAMS parameter is 8000 and the producer NF enters load level L1 from L0, drop the value of the SETTINGS_MAX_CONCURRENT_STREAMS PARAMETER by 5% after every 10 seconds, until value of the SETTINGS_MAX_CONCURRENT_STREAMS parameter reaches 6000 or the producer NF comes out of L1.
   When a producer NF (or intermediate node) moves to a lower load/overload level, do the following: Upon expiration of a regular interval/timer (referred to as "RT" in Table 2), increase the value of the SETTINGS_MAX_CONCURRENT_STREAMS parameter by a percentage (referred to as "D" in Table 2) until a maximum increase amount (referred to as "M" in Table 2) is reached.
   For example, when a producer NF enters level L1 from L2, increase the SETTINGS_MAX_CONCURRENT_STREAMS parameter by 5% (which was the drop rate of level L1) after every 8 seconds, until the value of the SETTINGS_MAX_CONCURRENT_STREAMS parameter reaches 6000.

For a given service (at a producer NF or intermediate node) and considering 4 (L1 to L4) configured load/overload levels, Table 2 illustrates parameters that can be used in adjusting the value of the SETTINGS_MAX_CONCURRENT_STREAMS parameter.

TABLE 2

SETTINGS_MAX_CONCURRENT_STREAMS Adjustment Control Parameters

| LO = Load/Overload Level | CT = Congestion Trigger Duration (ms) | RT = Recovery Trigger Duration (ms) | D = % change on each trigger (drop/rise) (relative to initial stream) | M = Max change on each trigger (drop/rise) (relative to initial stream) |
|---|---|---|---|---|
| L0 (Normal) | 0 | 8000 | 1% | 100% |
| L1 | 5000 | 4000 | 2% | 20% |
| L2 | 5000 | 4000 | 3% | 20% |
| L3 | 3000 | 3000 | 5% | 10% |
| L4 | 3000 | 3000 | 7% | 10% |

The values in Table 2 are shown for illustrative purposes only and may be adjusted based on parameters, such as the producer NF's processing latency, maximum transactions per second (TPS) per connection, producer NF capacity, etc.

Table 3 shown below illustrates examples of the parameters in Table 2 populated with exemplary values based on a producer NF or intermediate node with a processing latency of 100 ms and a maximum traffic rate of 5000 TPS per connection. From Equation 1 above, the initial value of the SETTINGS_MAX_CONCURRENT_STREAMS parameter is set to 500 (500*100/1000). Based on this initial value and configuration, the stream adjustment at various load/overload levels will be as follows:

TABLE 3

Example Values for Adjusting
SETTINGS_MAX_CONCURRENT_STREAMS Parameter

| LO | D | M | CD = D * Initial | CM = M * Initial |
|---|---|---|---|---|
| 0 | 0.01 | 1 | 5 | 500 |
| 1 | 0.02 | 0.2 | 10 | 400 |
| 2 | 0.03 | 0.2 | 15 | 300 |
| 3 | 0.05 | 0.3 | 25 | 150 |
| 4 | 0.07 | 0.1 | 35 | 100 |

Figure 5:
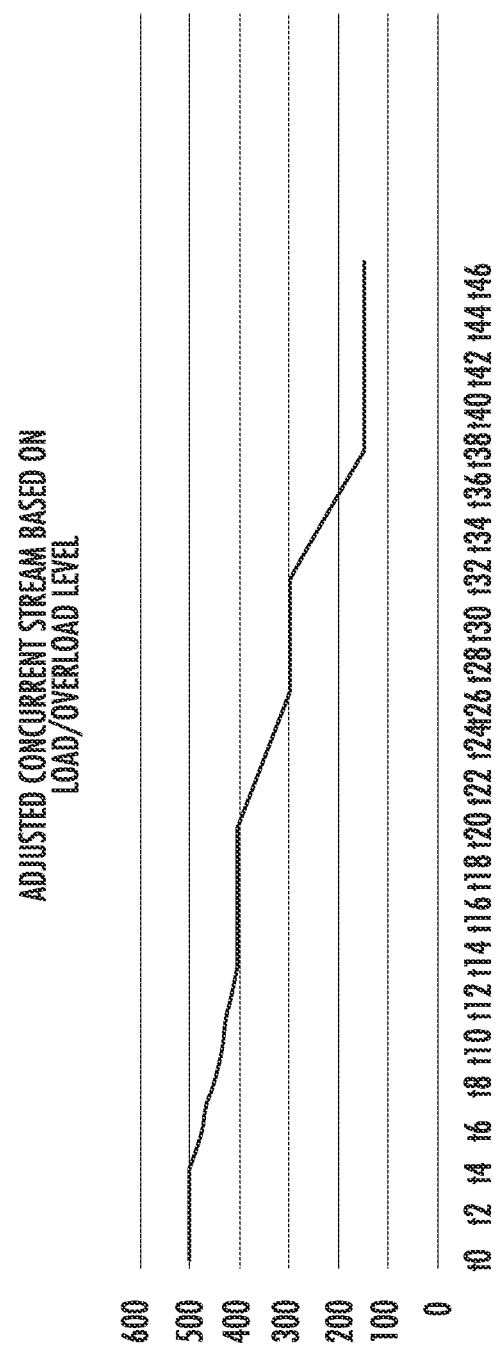
FIG. 5 is a graph illustrating adjustment of the SETTINGS_MAX_CONCURRENT_STREAMS based on load/overload level.

As described above, CT is the timer for the current LO level which is used to decrease the number of concurrent streams when the producer NF enters into (higher) congestion level. RT is the timer for the current LO level which is used to increase the value of the SETTINGS_MAX_CONCURRENT_STREAMS parameter when the producer NF or intermediate node moves to lower/normal congestion level. FIG. 5 is a graph illustrating adjustment of the message rate at the producer NF based on the data in Table 3.

Figure 6:
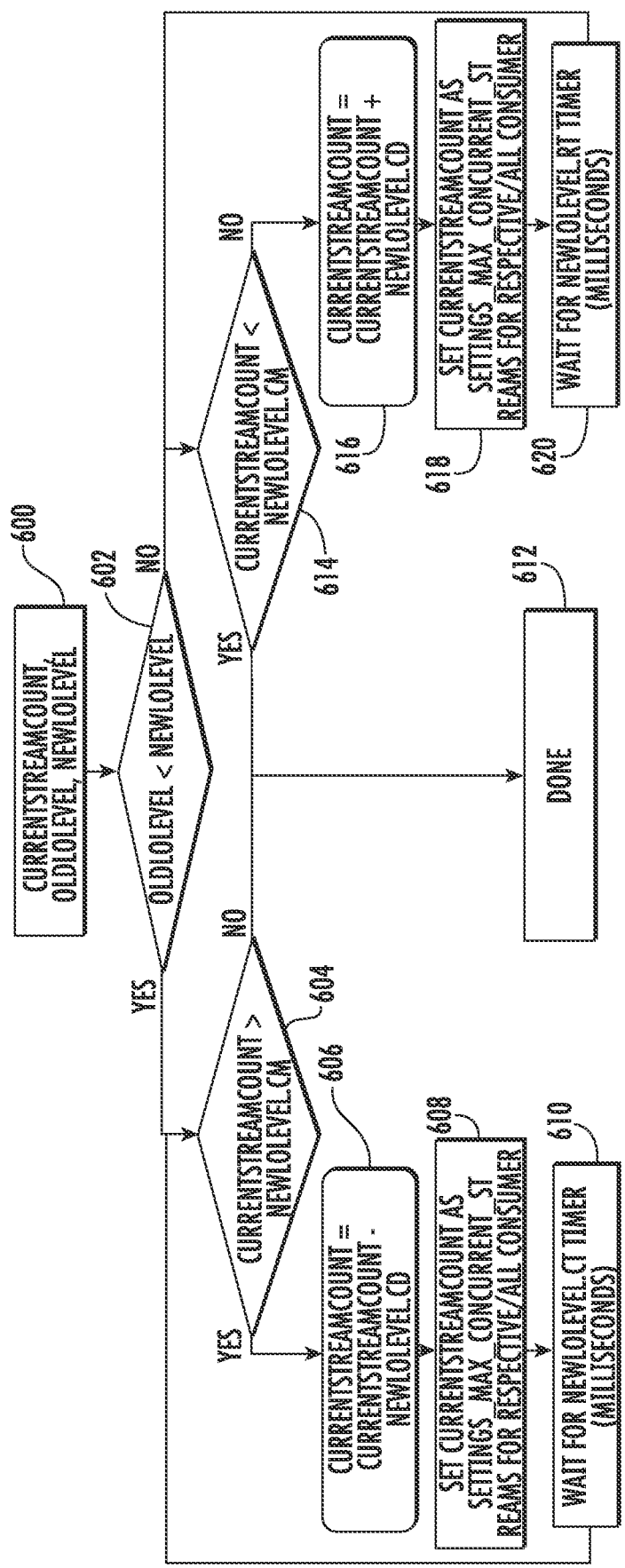
FIG. 6 is a flow chart illustrating an exemplary process for dynamically adjusting the SETTINGS_MAX_CONCURRENT_STREAMS parameter during load and overload control.

FIG. 6 is a flow chart illustrating the process for adjusting the value of the SETTINGS_MAX_CONCURRENT_STREAMS parameter in more detail. In FIG. 6, OldLoLevel and NewLoLevel refer to the objects used to store the current load level and its corresponding values of CT, RT, CD and CM. Referring to FIG. 6, in step 600, the process begins with the current count of concurrent streams and the objects OldLoLevel and NewLoLevel, which store the current values of the CT, RT, CD, and CM variables. Control then proceeds to step 602, where the process includes determining whether the current load/overload level is less than the new load/overload level. This determination is made by the producer NF or intermediate node based on the load metrics (e.g., processing capacity, queue depth, memory utilization, etc.) set by the network operator. If the current load/overload level is less than the new load/overload level, this means that the load on the producer NF or intermediate node has increased over one of the thresholds defined for increasing the level, and control proceeds to step 604 where the process includes determining whether the current stream count is greater than NewLoLevel.CM, which stores the value of the maximum change on each trigger value for the new level (see column 5 in Tables 2 and 3). If the current stream count is greater than NewLoLevel.CM, the number of streams can be reduced, and control proceeds to step 606 where the current stream count is decreased by the amount NewLoLevel.CD, which stores the value of the % change on each trigger value for the new level (see column 4 in Tables 2 and 3). Control then proceeds to step 608 where the value of the variable SETTINGS_MAX_CONCURRENT_STREAMS is set to the value of the current stream count variable after being decreased in step 606. Performing step 608 includes adjusting the SETTINGS_MAX_CONCURRENT_STREAMS parameter by sending a message to the consumer NF(s), providing the consumer NF(s) with a new setting for the value of the SETTINGS_MAX_CONCURRENT_STREAMS parameter that achieves the desired reduction in concurrent streams, which reduces the processing load on the producer NF or intermediate node. Control then proceeds to step 610 where the process waits for the expiration of NewLoLevel.CT timer before returning to step 604 where the process determines whether further decreases in the maximum concurrent streams can occur given the floor determined for the current load/overload level. If further decreases cannot occur, control proceeds to step 612 where the process ends.

Returning to step 602, of OldLoLevel is not less than NewLoLevel, control proceeds to step 614 where it is determined whether the current stream count can be increased (because the producer NF is in recovery mode). If the current stream count can be increased, control proceeds to step 616 where the stream count is increased by the amount NewLoLevel.CD defined for the new level. Control then proceeds to step 618 where the value of the SETTINGS_MAX_CONCURRENT_STREAMS parameter is set to the value of the CurrentStreamCount variable after being increased in step 616. The producer NF communicates the new value of the SETTINGS_MAX_CONCURRENT_STREAMS parameter to consumer NF(s) or intermediate node(s), which in turn reduce the number of concurrent streams to the new value, which starts increasing the traffic load on the producer NF or intermediate node. Control then proceeds to step 620 where the process waits for the expiration of the NewLoLevel.RT timer. When the timer expires, control returns to step 614 where it is determined whether the stream count can be further increased, given the maximum defined for the current load/overload level. If the current stream count can be increased, steps 616-620 are repeated. If the stream count cannot be further increased, the process ends.

At higher values of the LO level, values of "D", "CT" and "M" may be set aggressively, i.e., the drop in value of the SETTINGS_MAX_CONCURRENT_STREAMS parameter may be at lower rate for lower "LO" levels versus a higher rate at higher "LO" levels. At early load/overload level, do not close the "flow gates" fast but "hold and move" to cut traffic. At higher load/overload levels, "slow down" faster to ensure system stability. At a given level, an RT value that is lower than the CT value helps aggressively increase the number of concurrent streams when congestion is abating. For example, when a system moves from L0 to L1, CT drives the interval when the number of concurrent streams will decrease. When a system moves from L2 to L1, RT drives the interval when the number of concurrent streams will increase. Keeping RT>CT helps to increase the number of concurrent streams faster. The network operator can set RT=CT or RT<CT (for very slow recovery) if desired. The value of "M" may be determined based on the maximum number of TPS that the producer NF wants to support per connection at a given LO level. The solution can be enhanced further to add additional limits on the number of HTTP/2 connections from a given consumer NF, in a given LO level. With this enhancement, producer NFs and intermediate nodes can effectively control TPS that a given consumer or intermediate node can achieve in a specific load/overload level. This is an add-on to the proposed solution to control overall traffic over multiple connections from a consumer NF or intermediate node.

In the case where the producer NF is connected to the consumer NF through an SCP or SEPP, then load/overload and other parameters can be calculated based on an aggregation of load/overload levels of all services provided by the producer NF, e.g., the minimum load/overload level of all producer NF services. Similarly, the maximum TPS per connection may be based on the sum of maximum TPS that the producer NF can provide considering all services provided by the producer NF.

LCI/OCI notifications, when combined with tuning of the SETTINGS_MAX_CONCURRENT_STREAMS parameter, will force consumer NFs to slow down and/or send only higher priority traffic to a producer NF. If any consumer NF ignores LCI/OCI header data, the consumer NF will be forced to throttle traffic due to lower concurrent streams per connection.

Figure 7:
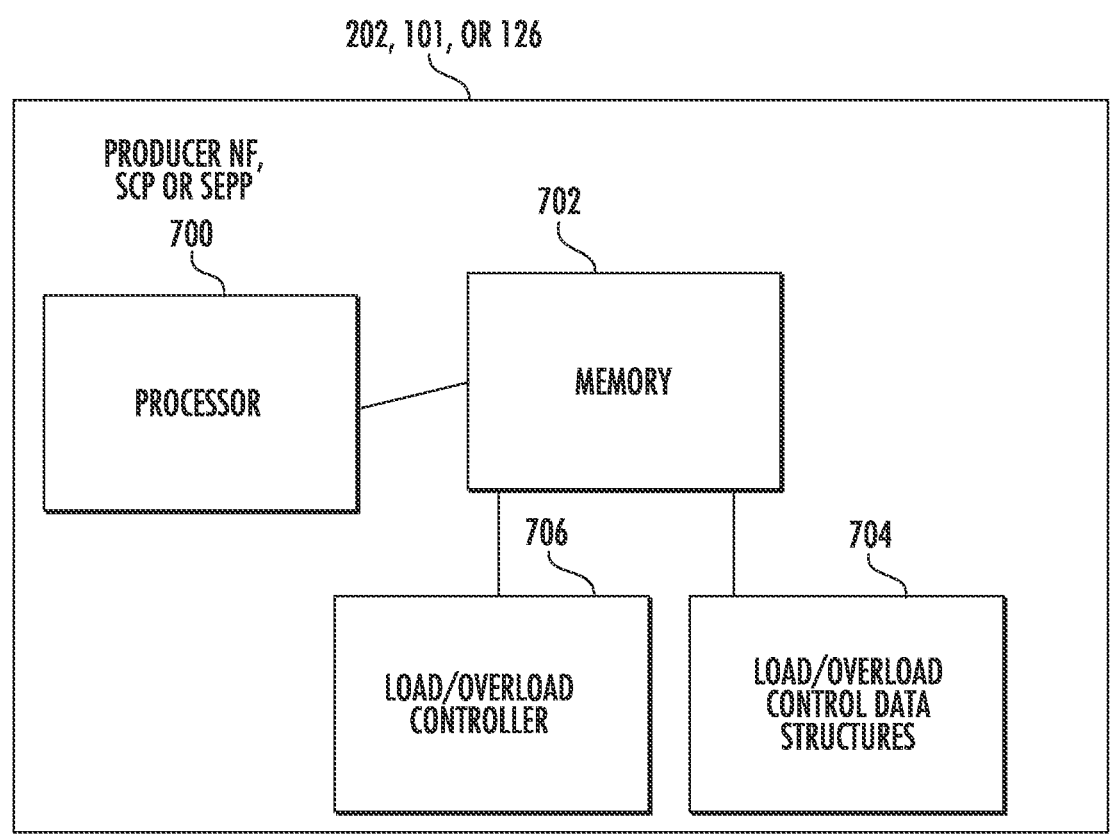
FIG. 7 is a block diagram illustrating an exemplary producer NF, SCP, or SEPP for dynamically adjusting the HTTP SETTINGS_MAX_CONCURRENT_STREAMS parameter during load and overload control.

FIG. 7 is a block diagram illustrating an example of a producer NF, SCP, or SEPP 202, 101, or 126 that performs load/overload control using the SETTINGS_MAX_CONCURRENT_STREAMS parameter as described above. Referring to FIG. 7, producer NF, SCP, or SEPP 202, 101, or 126 includes at least one processor 700 and a memory 702. Load/overload control data structures 704 may be stored in memory 702. Load/overload control data structures 704 may include data structures, such as those illustrated above in Tables 1 and 2 for controlling adjustment of the SETTINGS_MAX_CONCURRENT_STREAMS parameter based on the current load/overload level, changes in the level, and the direction of change in the level. A load/overload controller 706 may be implemented using computer executable instructions stored in memory 702 and executable by processor 700. Load/overload controller 706 may perform the steps described herein for adjusting the SETTINGS_MAX_CONCURRENT_STREAMS parameter based on the current load/overload level, changes in the level, and the direction of changes in the level.

The disclosure of each of the following references is hereby incorporated herein by reference in its entirety.

REFERENCES 1. 3GPP TS 29.500 V16.7.0 (2020-12); 3rd Generation Partnership Project; Technical Specification Group Core Network and Terminals; 5G System; Technical Realization of the Service Based Architecture; Stage 3 (Release 17).
2. 3GPP TS 29.510 V17.0.0 (2020-12); 3rd Generation Partnership Project; Technical Specification Group Core Network and Terminals; 5G System; Network Function Repository Services; Stage 3 (Release 17).
3. Belshe et. al, "Hypertext Transfer Protocol Version 2 (HTTP/2)," IETF RFC 7540 (May 2015).
4. TCP Congestion Control, https://en.wikipedia.org/wiki/TCP_congestion_control (last edited Mar. 4, 2021)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for hypertext transfer protocol (HTTP) stream tuning during load and overload control, the method comprising:
at a first network function (NF) including at least one processor and a memory:
determining a load/overload level of the first NF;
determining an initial value for an HTTP SETTINGS_MAX_CONCURRENT_STREAMS parameter;
publishing the initial value of the HTTP SETTINGS_MAX_CONCURRENT_STREAMS parameter to a second NF that sends traffic to the first NF;
determining that the load/overload level of the first NF has changed;
in response to determining that the load/overload level has changed, adjusting the value of the HTTP SETTINGS_MAX_CONCURRENT_STREAMS parameter based on the load/overload level and a direction of change in the load/overload level; and
publishing the adjusted value of the HTTP SETTINGS_MAX_CONCURRENT_STREAMS parameter to the second NF.

2. The method of claim 1 wherein the first NF comprises a producer NF and the second NF comprises a consumer NF that sends traffic to the producer NF.

3. The method of claim 1 wherein the first NF comprises a producer NF and the second NF comprises a service communications proxy (SCP) or security edge protection proxy (SEPP) that sends traffic to the producer NF.

4. The method of claim 1 wherein the first NF comprises a service communications proxy (SCP) or a security edge protection proxy (SEPP) and the second NF comprises a consumer NF that sends traffic to the SCP or SEPP.

5. The method of claim 1 wherein determining the initial value of the HTTP SETTINGS_MAX_CONCURRENT_STREAMS parameter includes calculating the initial value based on a desired transaction rate per second for the second NF and a roundtrip time for messaging between the first and second NFs.

6. The method of claim 5 wherein determining the initial value based on the desired transaction rate and the roundtrip time includes determining the initial value using the following equation:

$$MaxConStrms = RTT(\text{ms}) \left( \frac{RequestRate(\text{Requests/s})}{1000 \text{ (ms/s)}} \right),$$

where MaxConStrms is the HTTP SETTINGS_MAX_CONCURRENT_STREAMS parameter, RTT is the roundtrip time between the first and second NFs, and RequestRate is a desired request rate from the second NF.

7. The method of claim 1 determining that the load/overload level has changed includes determining that the load/overload level has increased.

8. The method of claim 7 wherein adjusting the value of the HTTP SETTINGS_MAX_CONCURRENT_STREAMS parameter includes reducing the value of the HTTP SETTINGS_MAX_CONCURRENT_STREAMS parameter by a fixed amount upon expiration of a timer and repeating the reducing until a minimum stream count for a current load/overload level is reached.

9. The method of claim 1 determining that the load/overload level has changed includes determining that the load/overload level has decreased.

10. The method of claim 9 wherein adjusting the value of the HTTP SETTINGS_MAX_CONCURRENT_STREAMS parameter includes increasing the value of the HTTP SETTINGS_MAX_CONCURRENT_STREAMS parameter by a fixed amount upon expiration of a timer and repeating the increasing until a maximum stream count for a current load/overload level is reached.

11. A system for hypertext transfer protocol (HTTP) stream tuning during load and overload control, the system comprising:
a first network function (NF) including at least one processor and a memory; and a load/overload controller implemented by the at least one processor for determining a load/overload level of the first NF, determining an initial value for an HTTP SETTINGS_MAX_CONCURRENT_STREAMS parameter, publishing the initial value of the HTTP SETTINGS_MAX_CONCURRENT_STREAMS parameter to a second NF that sends traffic to the first NF, determining that the load/overload level of the first NF has changed, in response to determining that the load/overload level has changed, adjusting the value of the HTTP SETTINGS_MAX_CONCURRENT_STREAMS parameter based on the load/overload level and a direction of change in the load/overload level, and publishing the adjusted value of the HTTP SETTINGS_MAX_CONCURRENT_STREAMS parameter to the second NF.

12. The system of claim 11 wherein the first NF comprises a producer NF and the second NF comprises a consumer NF that sends traffic to the producer NF.

13. The system of claim 11 wherein the first NF comprises a producer NF and the second NF comprises a service communications proxy (SCP) or security edge protection proxy (SEPP) that sends traffic to the producer NF.

14. The system of claim 11 wherein the first NF comprises a service communications proxy (SCP) or a security edge protection proxy (SEPP) and the second NF comprises a consumer NF that sends traffic to the SCP or SEPP.

15. The system of claim 11 wherein the load/overload controller is configured to determine the initial value of the SETTINGS_MAX_CONCURRENT_STREAMS parameter based on a desired transaction rate per second for the second NF and a roundtrip time for messaging between the first and second NFs.

16. The system of claim 15 wherein the load/overload controller is configured to determine the initial value of the SETTINGS_MAX_CONCURRENT_STREAMS parameter using the following equation:

$$MaxConStrms = RTT(\text{ms}) \left( \frac{RequestRate(\text{Requests/s})}{1000 \text{ (ms/s)}} \right),$$

where MaxConStrms is the HTTP SETTINGS_MAX_CONCURRENT_STREAMS parameter, RTT is the roundtrip time between the first and second NFs, and RequestRate is a desired request rate from the second NF.

17. The system of claim 11 wherein the load/overload controller is configured to determine that the load/overload level has increased.

18. The system of claim 17 wherein the load/overload controller is configured to adjust the value of the HTTP SETTINGS_MAX_CONCURRENT_STREAMS parameter by reducing the value of the HTTP SETTINGS_MAX_CONCURRENT_STREAMS parameter by a fixed amount upon expiration of a timer and repeat the reducing until a minimum stream count for a current load/overload level is reached.

19. The system of claim 11 wherein the load/overload controller is configured to determine that the load/overload level has decreased and, in response to adjust the value of the HTTP SETTINGS_MAX_CONCURRENT_STREAMS parameter by increasing the value of the HTTP SETTINGS_MAX_CONCURRENT_STREAMS parameter by a fixed amount upon expiration of a timer and repeat the increasing until a maximum stream count for a current load/overload level is reached.

20. A non-transitory computer readable medium having stored thereon executable instructions that when executed by a processor of a computer controls the computer to perform steps comprising:
at a first network function (NF) including at least one processor and a memory:
determining a load/overload level of the first NF;
determining an initial value for a hypertext transfer protocol (HTTP) SETTINGS_MAX_CONCURRENT_STREAMS parameter;
publishing the initial value of the HTTP SETTINGS_MAX_CONCURRENT_STREAMS parameter to a second NF that sends traffic to the first NF;
determining that the load/overload level of the first NF has changed;
in response to determining that the load/overload level has changed, adjusting the value of the HTTP SETTINGS_MAX_CONCURRENT_STREAMS parameter based on the load/overload level and a direction of change in the load/overload level; and
publishing the adjusted value of the HTTP SETTINGS_MAX_CONCURRENT_STREAMS parameter to the second NF.

* * * * *